United States Patent
Lee

(10) Patent No.: US 9,085,284 B2
(45) Date of Patent: Jul. 21, 2015

(54) ADAPTER FOR WINDSHIELD WIPER ASSEMBLY

(75) Inventor: Albert Lee, Baltimore, MD (US)

(73) Assignee: ALBEREE PRODUCTS, INC., Halethorpe, MD (US)

( * ) Notice: Subject to any disclaimer, the term of this patent is extended or adjusted under 35 U.S.C. 154(b) by 842 days.

(21) Appl. No.: 12/564,557

(22) Filed: Sep. 22, 2009

(65) Prior Publication Data

US 2010/0186184 A1     Jul. 29, 2010

Related U.S. Application Data

(60) Provisional application No. 61/099,460, filed on Sep. 23, 2008.

(51) Int. Cl.
  *B60S 1/40*   (2006.01)
  *B60S 1/38*   (2006.01)

(52) U.S. Cl.
  CPC ............. *B60S 1/4006* (2013.01); *B60S 1/4048* (2013.01); *B60S 1/4074* (2013.01); *B60S 1/4087* (2013.01); *B60S 1/387* (2013.01)

(58) Field of Classification Search
  USPC ....................................... 15/250.32
  IPC ........................................................ B60S 1/40
  See application file for complete search history.

(56) References Cited

U.S. PATENT DOCUMENTS

| | | | |
|---|---|---|---|
| 5,611,103 A * | 3/1997 | Lee | 15/250.32 |
| 2003/0066153 A1* | 4/2003 | Rosenstein et al. | 15/250.32 |
| 2004/0123414 A1* | 7/2004 | Lee | 15/250.32 |
| 2005/0005387 A1* | 1/2005 | Kinoshita et al. | 15/250.32 |
| 2008/0313841 A1* | 12/2008 | De Block et al. | 15/250.32 |

FOREIGN PATENT DOCUMENTS

| | | | | |
|---|---|---|---|---|
| JP | 2006096196 A | * | 4/2006 | |
| JP | 2007204036 | * | 4/2007 | B60S 1/40 |
| JP | 2007204036 A | * | 8/2007 | |

* cited by examiner

*Primary Examiner* — Monica Carter
*Assistant Examiner* — Stephanie Berry
(74) *Attorney, Agent, or Firm* — Birch, Stewart, Kolach & Birch, LLP

(57) ABSTRACT

An adapter for a windshield wiper assembly includes a head; and a body connected to the head and configured to cooperate with a bracket of a windshield wiper assembly to attach the windshield wiper assembly to a windshield wiper arm, the body including a bulge portion, and a cutout defining portion.

4 Claims, 8 Drawing Sheets

US 9,085,284 B2

ADAPTER FOR WINDSHIELD WIPER ASSEMBLY

CROSS-REFERENCE TO RELATED APPLICATIONS

This application claims the benefit of U.S. Provisional Application No. 61/099,460 filed Sep. 23, 2008. The entirety of the above-identified provisional application is incorporated herein by reference.

BACKGROUND OF THE INVENTION

1. Field of the Invention

The present invention is directed generally to adapters for a windshield wiper assembly. More particularly, the present invention is directed to adapters configured to cooperate with one or more windshield wiper arm designs so that an adapter is usable with different windshield wiper arms.

2. Description of Related Art

Various types of windshield wiper assemblies having a body utilizing a pair of leaf spring elements are known. For example, one windshield wiper assembly uses two parallel pieces of spring steel to secure a squeegee therebetween. The two pieces of spring steel are spot welded together in spaced apart relationship with a portion of the squeegee being located between the two pieces of spring steel. Although this background art windshield wiper assembly eliminates the necessity of having multiple frame elements to make up the body of the windshield wiper assembly, the spot welding prevents easy replacement of the squeegee.

Additionally, various types of windshield wiper arms are available which utilize respective adapters for connection of the windshield wiper assemblies to the windshield wiper arms, respectively. Thus, generally, a particular adapter may be usable only with a particular type of windshield wiper arm.

BRIEF SUMMARY OF THE INVENTION

Accordingly, it is an object of the present invention to provide a windshield wiper assembly, which eliminates the above problems encountered with windshield wiper assemblies according to the background art.

The adapters of the present invention are usable with different windshield wiper arms.

According to an embodiment of the present invention, an adapter for a windshield wiper assembly includes a head; and a body connected to the head and configured to cooperate with a bracket of a windshield wiper assembly to attach the windshield wiper assembly to a windshield wiper arm, the body including a bulge portion, and a cutout defining portion.

According to an embodiment of the present invention, an adapter for a windshield wiper assembly includes a head; a body connected to the head and configured to cooperate with a bracket of a windshield wiper assembly to attach the windshield wiper assembly to a windshield wiper arm, the body including a hole in an intermediate portion thereof; and a leg portion.

According to an embodiment of the present invention, an adapter for a windshield wiper assembly includes a head; a body connected to the head; a tail connected to the body; a flap connected to the body; and a receiving portion generally defined by the body and the tail, wherein the flap covers the receiving portion when in a closed position.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the Detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or similar parts.

Additionally, the disclosures of U.S. Pat. Nos. 5,611,103, 5,632,059 and 7,207,082, having the same inventor as this application, are incorporated by reference herein in their entirety.

Figure 1:
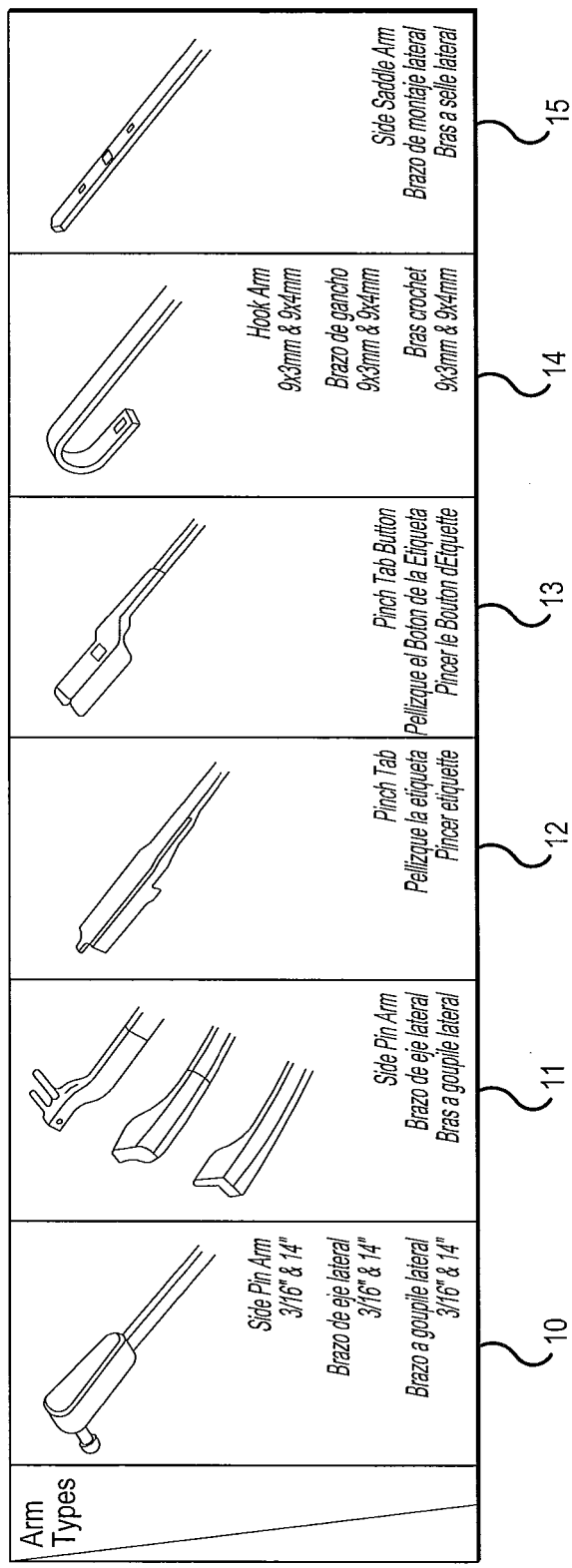
FIG. 1 shows various types of arms for a windshield wiper usable with brackets according to embodiments of the present invention.

FIG. 1 shows various types of arms for a windshield wiper usable with adapters according to embodiments of the present invention. As shown in FIG. 1, the referenced various types of arms may be side pin arms 10 and 11, pinch tab arms 12 and 13, a hook arm 14, and a side saddle arm 15.

The side pin arms generally include a side extending pin or an extension that enable attachment of an arm to an adapter. For example, the side pin arm 10 includes a single pin that is inserted into a single hole on a side of an adapter to secure the side pin arm 10 to an adapter. The side pin arm 11 may be of various configurations, one of which has two pins that are inserted into holes on a side of an adapter, and others that have extensions that cooperate with the adapter, to secure the side pin arm 11 to the adapter. The pinch tab 12 and the pinch tab button 13 are arms that generally grab the adapter for attachment, while the hook arm 14 is used to slide an adapter in between the hook portion for the attachment. Finally, the side saddle arm 15 is used to insert the arm into an opening of an adapter for attachment. Accordingly, although each type of arm will cooperate with only one adapter that is specialized for that the arm, generally, the adapters according to various embodiments of the present invention are configured to cooperate with a plurality of types of arm.

Figure 2A:
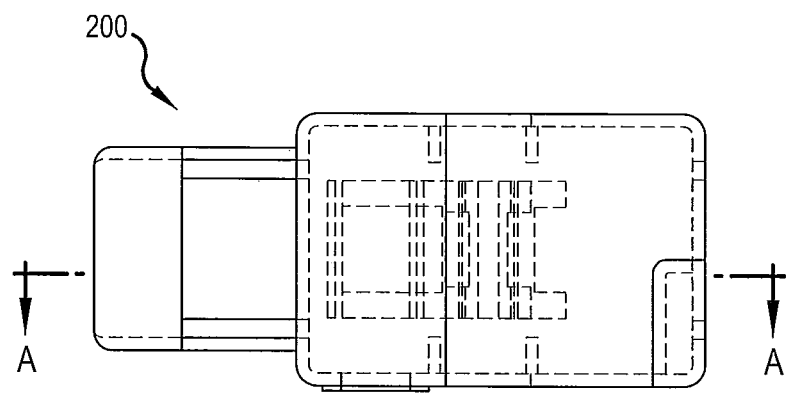
FIGS. 2A-2E are various views of an adapter according to one example embodiment of the present invention.
Figure 2B:
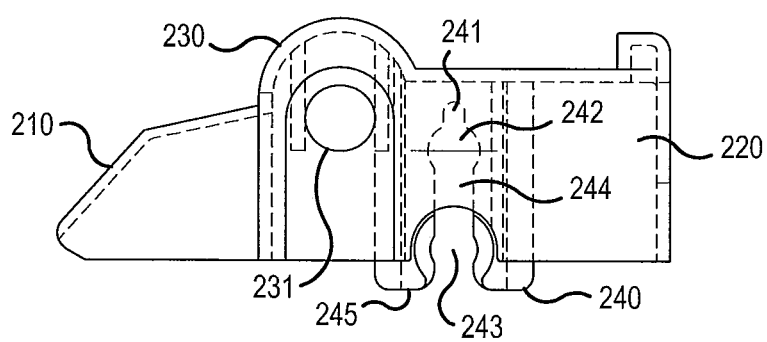
Figure 2C:
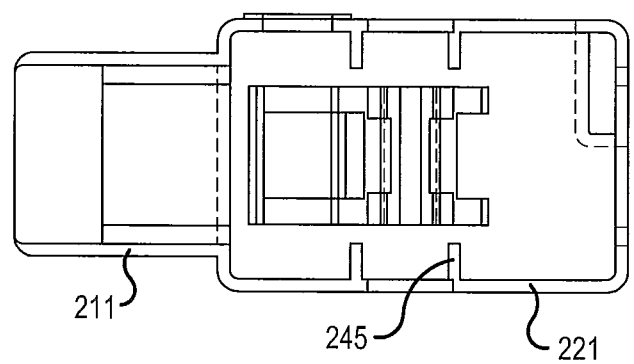
Figure 2D:
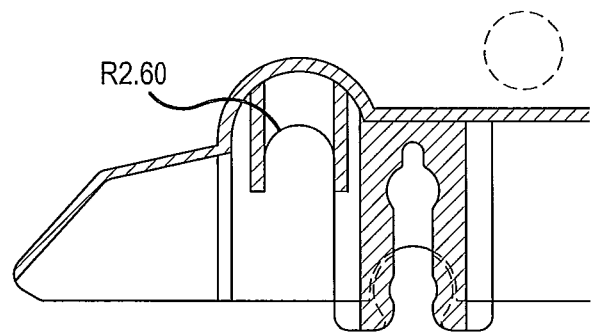
Figure 2E:
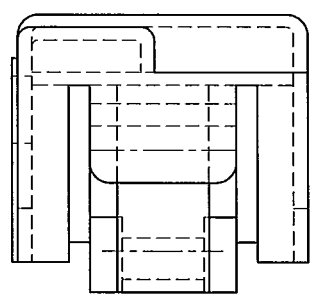

FIGS. 2A-2E are various views of an adapter according to one example embodiment of the present invention. FIG. 2A is a top plan view of the adapter 200, FIG. 2B is a side elevational view of the adapter 200, FIG. 2C is a bottom plan view of the adapter 200, FIG. 2D is a cross-sectional view of the adapter 200 at line A in FIG. 2A and FIG. 2E is a back end view of the adapter 200.

As shown in FIG. 2B, the adapter 200 includes a head 210 and a body 220. The adapter further includes a bulge portion 230, and a cutout defining portion 240 generally located in the body 220. The bulge portion accommodates a hole 230 that is generally circular, while the cutout defining portion 240 includes a notch 241, a first hole 242, a second hole 243, a channel 244 and an extending portion 245.

The first and second holes 242 and 243 are generally circular, and communicate with each other via the channel 244. The first and second holes 242, 243 are generally the same size, but such is not required, and the channel 244 extends directly from the first hole 242 to the second hole 243. The width of the channel 244 is generally narrower than the diameter of the first and second holes 242, 243, and the width of the notch 242 is narrower than the width of the channel 242, but such is not required. The notch 242 is on an opposite side of the first hole 242 from the channel 244.

The extending portion 245 extends from the body 220 opposite the hole 230 (or the bulge hole), beyond a lower portion of the body 220. The extending portion 245 accommodates the second hole 243 so that a portion of the second hole 243 is formed within the extending portion 245. The notch 241, the first hole 242, the channel 244 and the second hole 243 are generally collinear, and are symmetric about a line defined by centers of the first and second holes 242, 243.

As shown in FIG. 2C, the head 210 has side walls 211, and the body 220 has side walls 221. The width of the head 210 is smaller than the width of the body 220. Additionally, as shown in FIG. 2C, the cutout defining portion 240 has a plurality of walls 245 formed perpendicularly to the side walls 221 of the body 220. The walls 245 are parallel to the channel 244. Additionally, as shown in FIG. 2D, the curvature of the bulge hole 231 may be 82.60 mm, but such is not required. Other curvatures are within the scope of the embodiment.

In embodiments of the present invention, the hole 231 may be formed on only a single wall of the side walls 221 or both, and the first and second holes may be formed on only a single wall of the side walls 221 or both. By having the bulge hole 230, and the first and second holes 242, 243, the adapter 200 is usable with the side pin arm 10 and also the side pin arm 11.

Figure 3A:
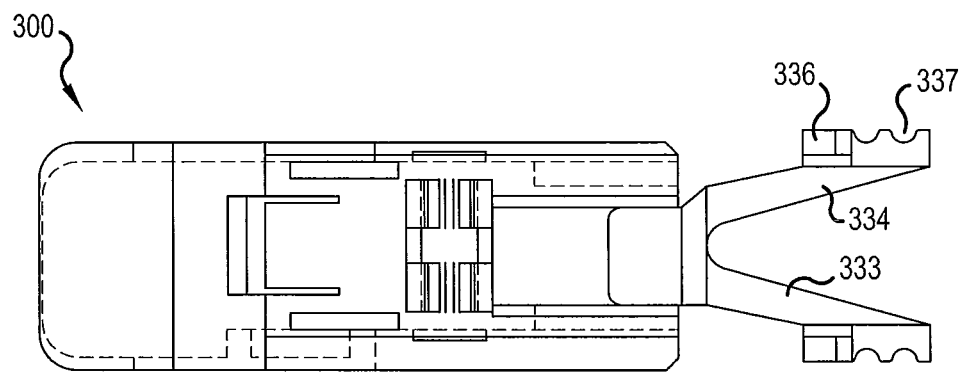
FIGS. 3A-3E are various views of an adapter according to another example embodiment of the present invention.
Figure 3B:
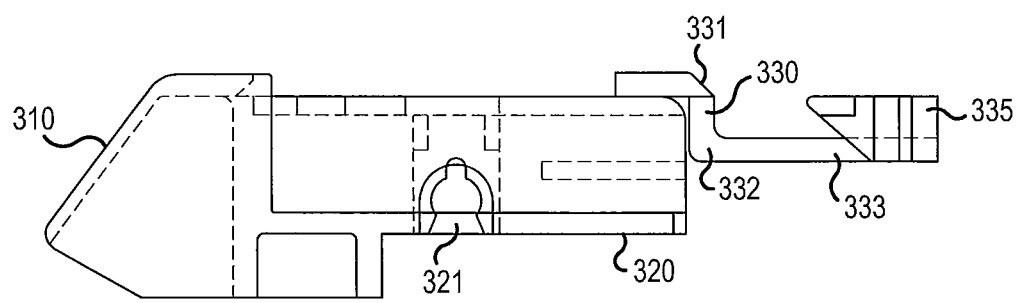
Figure 3C:
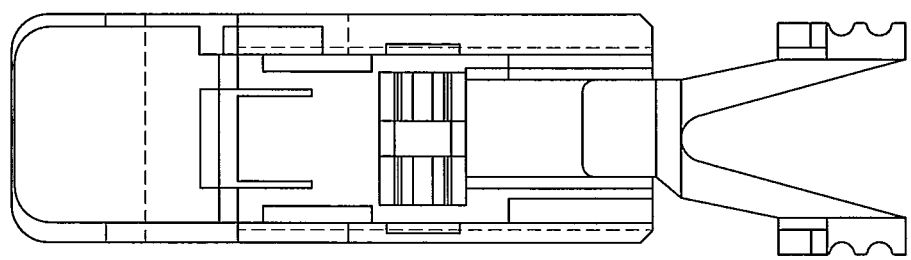
Figure 3D:
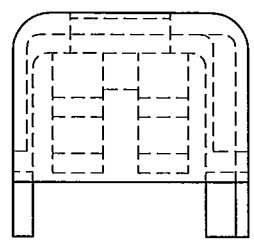
Figure 3E:
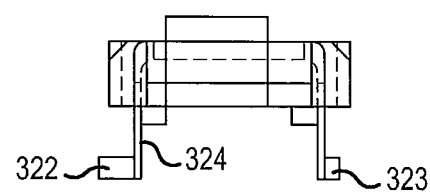

FIGS. 3A-3E are various views of an adapter according to another example embodiment of the present invention. FIG. 3A is a top plan view of the adapter 300, FIG. 3B is a side elevational view of the adapter 300, FIG. 3C is a bottom plan view of the adapter 300, FIG. 3D is a front end view of the adapter 300, and FIG. 3E is a back end view of the adapter 300.

As shown in FIG. 3B, the adapter 300 includes a head 310, a body 320, and a leg portion 330. The body 320 includes a hole 321 in an intermediate portion, and has a flared opening and a notch on opposite sides of the hole 321. The leg portion 330 extends away from the body 320, and includes an attaching portion 331, a bent portion 332, legs 333, 334 and feet 335.

The leg portion 330 is attached to the body 320 via the attaching portion 331, which extends generally parallel to an upper surface of the body 320. The attaching portion 331 is connected to a bent portion 332, which first extends generally perpendicular to the attaching portion 331, then connects to the legs 333 and 334. The legs 333 and 334 extend outward from the body 320 in a generally V-shaped configuration as shown in FIG. 3A, and are respectively attached to feet 335. The legs 333 and 334 are not generally parallel to the body 320 as shown in FIG. 3A. The legs 333 and 334 are not symmetric. As shown in FIG. 3A, for example, the leg 333 generally diagonally extends immediately out from the bent portion 332, while the leg 334 is further translated to the side (upper part of FIG. 3A) before diagonally extending towards the foot 335.

Unlike the legs 333 and 334, the feet 335 are generally parallel to the body 320. The feet 335 have a first notch 336 and a pair of second notches 337. The first notch 336 is formed on an upper end of the feet 335 while the pair of second notches 337 extend vertically on the feet 335. As shown in FIG. 3A, the cross-sectional shape of the first notch 336 is rectangular, while the cross-sectional shape of the pair of second notches 337 are semi-circles.

As shown in FIG. 3E, the body 320 include side walls 324 respectively having a first flap 322 and a second flap 323. The first and second flaps 322 and 323 generally extend in a lengthwise direction of the body 320, and also extend outward and perpendicularly from the side walls 324. The length of the first and second flaps are different as shown in FIG. 3E. Accordingly, the adapter 300 is usable with both the pinch tab arm 12 and the pinch tab button arm 13 of FIG. 1.

Figure 4A:
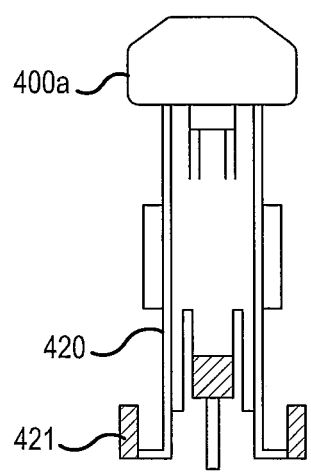
FIGS. 4A-4B are various views of an adapter according to another example embodiment of the present invention.
Figure 4B:
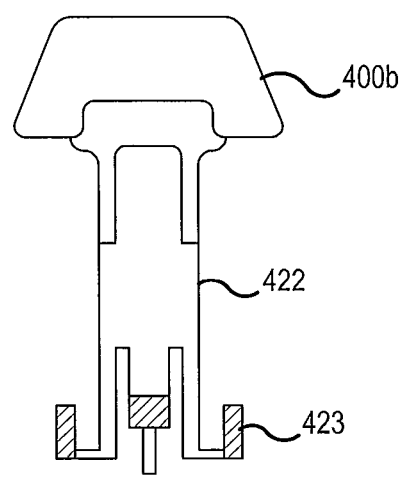

FIGS. 4A and 4B are various views of an adapter according to another example embodiment of the present invention. FIG. 4A is a plan view of an adapter 400*a* and FIG. 4B is a plan view of an adapter 400*b*. In FIG. 4A, shown is the adapter 400*a* having a body 420 with arm locks 421 located to the sides thereof Similarly, in FIG. 4B, shown is the adapter 400*b* having a body 422 with arm locks 423 located to the sides thereof.

The arm locks 421 are respectively located on opposite sides of the body 420, and the arm locks 423 are respectively located on opposite sides of the body 422. Accordingly, the arm locks 421 and 423 more easily release the respective adapters 400*a*, 400*b* from attached windshield wiper arms.

Figure 5A:
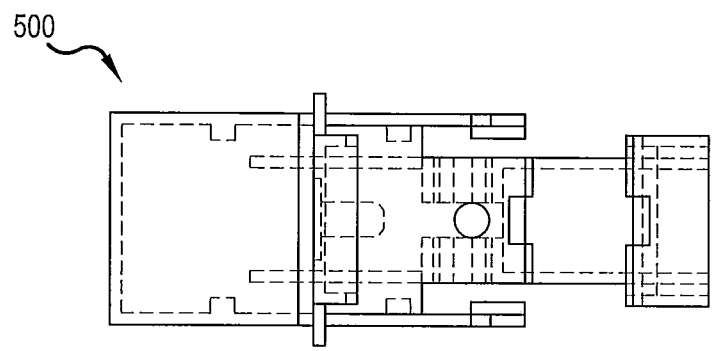
FIGS. 5A-5E are various views of an adapter according to another example embodiment of the present invention.
Figure 5B:
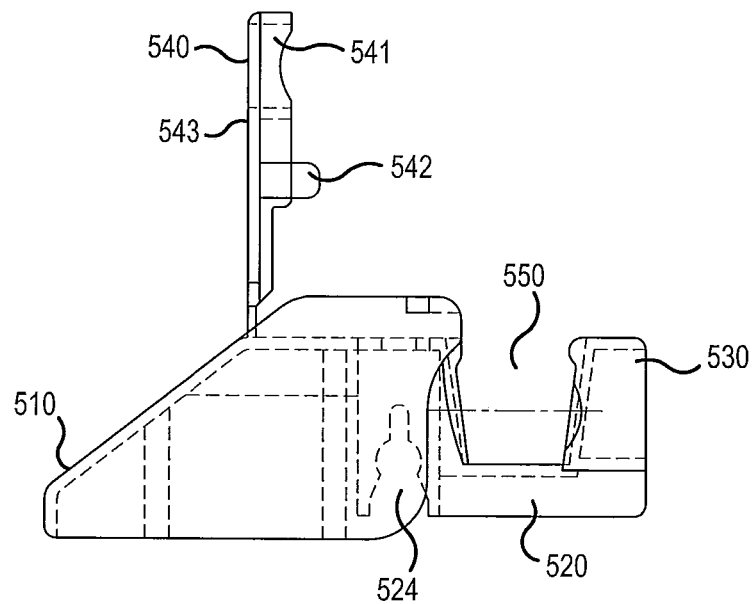
Figure 5C:
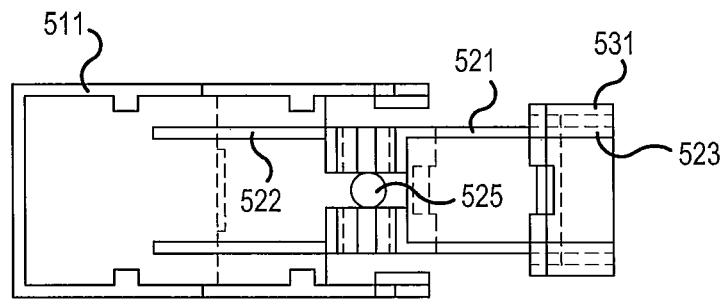
Figure 5D:
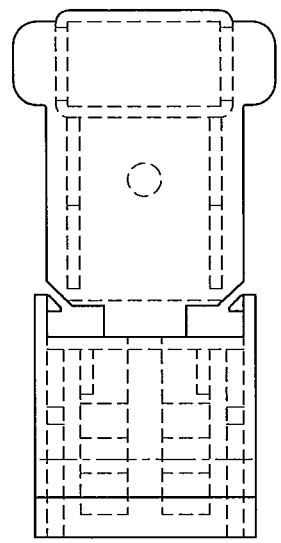
Figure 5E:
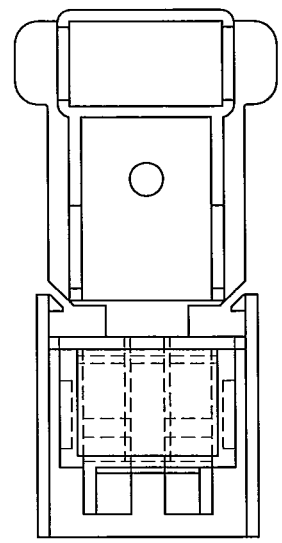

FIGS. 5A-5E are various views of an adapter according to another example embodiment of the present invention. FIG. 5A is a top plan view of the adapter 500, FIG. 5B is a side elevational view of the adapter 500, FIG. 5C is a bottom plan view of the adapter 500, FIG. 5D is a front end view of the adapter 500, and FIG. 5E is a back end view of the adapter 500.

As shown in FIG. 5B, the adapter 500 includes a head 510, a body 520, a tail 530, a flap 540, and a receiving portion 550 generally defined by the body 520 and the tail 530. Both the body 520 and the flap 540 are attached to the head 510. The body 520 extends parallel to and away from the head 510. As shown in FIG. 5C, the head 510 includes sidewalls 511, and the body 520 includes side walls 521, 522 and 523 that are generally collinear. The sidewalls 522 (inner sidewalls) of the body 520 are nested within the interior of the head 510 between the parallel sidewalls 511, while the sidewalls 523 (support sidewalls) of the body 520 support the tail 530. The sidewalls 521 (main sidewalls) of the body 520 connects the inner sidewalls 522 to the support sidewalls 523.

As shown in FIG. 5B, in the inner sidewalls 522 is located a first hole 524 in an intermediate portion next to the main sidewalls 521. The first hole 524 has a flared opening and a notch on opposite sides of the first hole 524. Additionally, as show in FIG. 5C is a second hole 525 that is formed in a portion of the body 520 connected to the head 510. As shown in FIGS. 5B and 5C, the second hole 525 is formed approximately at a location that is between the main sidewalls 521.

As shown in FIG. 5B, the flap 540 includes side walls 541 that define a rectangular shape or profile (shown in FIG. 5E), a top cover 543, and a pin 542. The flap 540 is movable from a raised position (opened position) shown in FIG. 5B, to a lowered position (closed position) that is not shown. In the lowered position, the flap 540 is rotated about a portion that is connected to the head 510, and covers a top of the receiving portion 550. When the flap 540 is lowered, the pin 542 is inserted into the hole 525 to secure the flap 540.

Prior to the flap 540 being lowered, a wiper arm (not shown) having a rectangular shape that matches the rectangular shape or profile of the side walls 541 is received in the receiving portion 550. When the flap 540 is lowered on the received wiper arm (not shown), the wiper arm is secured to the adapter 500. The shape or profile of the side walls 541 need not be rectangular, and other shapes or profiles are within the scope of the invention.

The tail 530 further includes additional flaps 531 that secure another part of the arm to rest on the additional flaps 531. Thus, the additional flaps 531 afford greater stability of a connection between the adapter 500 and an arm.

The invention thus being described, it will be obvious that the same may be varied in many ways. For example, an upper surface of each side wall of the bracket may have a notch formed therein if necessary to accommodate various adapters. Such variations are not to be regarded as a departure from the spirit and scope of the invention, and all such modifications as would be obvious to one skilled in the art are intended to be included within the scope of the following claims.

What is claimed:

1. An adapter for a windshield wiper assembly, the adapter comprising:
   a head; and
   a body connected to the head and configured to cooperate with a bracket of a windshield wiper assembly to attach the windshield wiper assembly to a windshield wiper arm, the body including a bulge portion, and a cutout defining portion,
   wherein the bulge portion has a rounded extension that extends perpendicular to an axis defined by the head and the body, and
   wherein the cutout defining portion includes a notch, a first hole, a second hole, a channel and an extending portion.

2. The adapter of claim 1, wherein the bulge portion accommodates a hole.

3. An adapter for a windshield wiper assembly, the adapter comprising:
   a head;
   a body connected to the head and configured to cooperate with a bracket of a windshield wiper assembly to attach the windshield wiper assembly to a windshield wiper arm, the body including a hole in an intermediate portion thereof; and
   a leg portion,
   wherein the leg portion has a V-shaped configuration that extends parallel to an axis defined by the head and the body,
   wherein the leg portion extends away from the body, and includes an attaching portion, a bent portion, legs and feet, and
   wherein the legs each includes a first leg portion and a second leg portion, whereby the bent portion perpendicularly connects the first leg portion and the second leg portion.

4. The adapter of claim 1, wherein an outer periphery of the rounded extension of the bulge and an outer surface of the head intersect.

\* \* \* \* \*